US008125471B2

(12) United States Patent
Sagawa

(10) Patent No.: US 8,125,471 B2
(45) Date of Patent: Feb. 28, 2012

(54) IMAGE OUTPUT APPARATUS, IMAGE OUTPUT METHOD, AND PROJECTOR

(75) Inventor: Takahiro Sagawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 454 days.

(21) Appl. No.: 12/469,900

(22) Filed: May 21, 2009

(65) Prior Publication Data

US 2009/0290073 A1 Nov. 26, 2009

(30) Foreign Application Priority Data

May 22, 2008 (JP) ................................. 2008-134630

(51) Int. Cl.
*G09G 5/00* (2006.01)
(52) U.S. Cl. .............................. 345/204; 345/87; 345/94
(58) Field of Classification Search .................... 345/87, 345/94, 204
See application file for complete search history.

(56) References Cited

FOREIGN PATENT DOCUMENTS

JP A-05-150751 6/1993

*Primary Examiner* — Amare Mengistu
*Assistant Examiner* — Premal Patel
(74) *Attorney, Agent, or Firm* — Oliff & Berridge, PLC

(57) ABSTRACT

An image output apparatus includes: a display device having a light modulation section which is divided into a plurality of channels and drives the divided channels; a plurality of level adjusting units that are provided for each channel, adjust the levels of video input signals for each channel, and output adjusted output signals to the display device; an adjustment amount correcting unit that performs a basic correction process; a continuous correction control unit that controls the adjustment amount correcting unit to perform the basic correction process during a first predetermined period; and an intermittent correction control unit that controls the adjustment amount correcting unit to perform the basic correction process a predetermined number of times during a second predetermined period.

10 Claims, 4 Drawing Sheets

IMAGE OUTPUT APPARATUS, IMAGE OUTPUT METHOD, AND PROJECTOR

The entire disclosure of Japanese Patent No. 2008-134630 filed May 22, 2008 is expressly incorporated by reference herein.

BACKGROUND

1. Technical Field

The present invention relates to an image output apparatus, an image output method, and a projector including the image output apparatus.

2. Related Art

For example, in a liquid crystal display, since there are a large number of pixels in a horizontal direction, a light modulation section filled with the pixels is divided into a plurality of channels in the horizontal direction, and the divided channels are driven. In an image output apparatus connected to the liquid crystal display having the above-mentioned structure, it is necessary to make the output levels of output circuits provided for each channel equal to each other in order to prevent the occurrence of display irregularity.

Therefore, JP-A-5-150751 discloses a structure that can adjust the levels of output circuits provided for each channel. Specifically, in the structure, a reference signal is input to each of the output circuits, the output of each of the output circuits is compared with predetermined reference data, and the level adjustment amounts of the corresponding output circuits are corrected on the basis of the comparison results.

However, in the related art, it is necessary to provide an A/D converter that performs analog/digital conversion on the output of each of the output circuits and a CPU that compares the output of the A/D converter with the reference signal and outputs a correction signal. Therefore, it is difficult to integrate the entire image output apparatus into one chip to reduce the size thereof. It is possible to reduce the size of an apparatus by simplifying the structure thereof. However, if correction accuracy is lowered, it is difficult to sufficiently reduce display irregularity.

SUMMARY

An advantage of some aspects of the invention is that it provides a technique capable of reducing the overall size of an apparatus and sufficiently reducing display irregularity.

According to a first aspect of the invention, there is provided an image output apparatus. The image output apparatus includes: a display device having a light modulation section which is divided into a plurality of channels and drives the divided channels; a plurality of level adjusting units that are provided for each channel, adjust the levels of video input signals for each channel, and output adjusted output signals to the display device; an input switching unit that switches a signal input to each of the level adjusting units from the video input signal to a first reference signal; an adjustment amount correcting unit that performs a basic correction process of comparing an output signal from each of the level adjusting units when the first reference signal is input with a second reference signal and increasing or decreasing an adjustment amount of the corresponding level adjusting unit by a predetermined correction amount such that a difference between the signals is reduced; a continuous correction control unit that controls the input switching unit to perform switching to the first reference signal during a first predetermined period included in a preparation period after a power supply is turned on or a preparation period before display starts, and controls the adjustment amount correcting unit to repeatedly perform the basic correction process a plurality of times; and an intermittent correction control unit that controls the input switching unit to perform switching to the first reference signal during a second predetermined period that is periodically generated other than the preparation period and controls the adjustment amount correcting unit to perform the basic correction process a predetermined number of times that is less than the number of times the basic correction process is repeatedly performed under the control of the continuous correction control unit.

In the image output apparatus, the input switching unit switches a signal input to each of the level adjusting units from the video input signal to a first reference signal. Then, the adjustment amount correcting unit performs a basic correction process of comparing an output signal from each of the level adjusting units with the second reference signal and increasing or decreasing the adjustment amount of the corresponding level adjusting unit by a predetermined correction amount such that the difference between the signals is reduced. As a result, it is possible to correct the adjustment amount of each of the level adjusting units by a predetermined amount. In particular, in the image output apparatus, the continuous correction control unit controls the input switching unit to perform switching to the first reference signal during the first predetermined period included in the preparation period after the power supply is turned on or the preparation period before display starts, and controls the adjustment amount correcting unit to repeatedly perform the basic correction process a plurality of times. In this way, it is possible to correct the output signal from each of the level adjusting units by a predetermined amount a plurality of times. In addition, the intermittent correction control unit controls the input switching unit to perform switching to the first reference signal during the second predetermined period that is periodically generated other than the preparation period and controls the adjustment amount correcting unit to perform the basic correction process a predetermined number of times that is less than the number of times the basic correction process is repeatedly performed under the control of the continuous correction control unit. Therefore, it is possible to periodically perform a small number of correction operations continuously.

Therefore, according to the image output apparatus of the first aspect, during the preparation period after the power supply is turned on or during the preparation period before display starts, continuous correction is performed to reliably make the output signal from each of the level adjusting units uniform. After the preparation period, periodic correction is continuously performed a small number of times to maintain the level of each of the output signals to be uniform. In particular, it is preferable that a 'predetermined correction amount' in the basic correction process be small in order to increase correction accuracy. In this case, the smaller the correction amount becomes, the longer the time required to make the level of the output signal uniform becomes. In contrast, according to the image output apparatus of the first aspect, during the preparation period after the power supply is turned on or during the preparation period before display starts that has no influence on image display, the basic correction process is continuously performed a plurality of times to reliably make the level of the output signal uniform. Thereafter, the basic correction process is intermittently performed a small number of times to correct a variation in level due to, for example, a temperature variation, a power supply voltage variation, and a variation over time in a short time. Therefore, it is possible to reduce a predetermined correction amount in the basic correction process. As a result, it is possible to improve correction accuracy.

Further, according to the image output apparatus of the first aspect, the adjustment amount correcting unit determines only the relationship between the level of the output signal from the level adjusting unit and the level of the second reference signal. Therefore, it is possible to use the output signal from the level adjusting unit for the comparison without any change. Thus, it is not necessary to provide an A/D converter unlike the image output apparatus disclosed in JP-A-5-150751. Therefore, it is easy to reduce the overall size of an apparatus, and it is possible to integrate the apparatus into one chip. As a result, according to the image output apparatus of the first aspect, it is possible to reduce the overall size of an apparatus and sufficiently reduce display irregularity.

According to a second aspect of the invention, in the image output apparatus according to the first aspect, the second predetermined period may be a vertical retrace period. According to this structure, it is possible to correct a level adjustment amount without any influence on an image displayed by the display device.

According to a third aspect of the invention, in the image output apparatus according to the first or second aspect, the predetermined number of times the basic correction process is performed under the control of the intermittent correction control unit may be one. According to this structure, it is possible to set the second predetermined period in a short time.

According to a fourth aspect of the invention, in the image output apparatus according to any one of the first to third aspects, the adjustment amount correcting unit may include: a signal comparator that compares the output signal from each of the level adjusting units when the first reference signal is input with the second reference signal and determines whether the level of the output signal is higher than that of the second reference signal; and a predetermined correction amount increasing/decreasing unit that decreases the adjustment amount of the level adjusting unit by a predetermined correction amount when the signal comparator determines that the level of the output signal is higher than that of the second reference signal, and increases the adjustment amount of the level adjusting unit by the predetermined correction amount when the signal comparator determines that the level of the output signal is lower than that of the second reference signal.

According to the image output apparatus of the fourth aspect, it is possible to form an adjustment amount correcting unit with a simple structure, such as the signal comparator and the predetermined correction amount increasing/decreasing unit.

According to a fifth aspect of the invention, in the image output apparatus according to the fourth aspect, each of the level adjusting units may include a digital/analog converter that converts the video input signal, which is a digital signal, into an analog signal. The predetermined correction amount increasing/decreasing unit may include: a gain adjusting unit that adjusts the gain of the digital/analog converter; and an offset adjusting unit that adjusts the offset of the digital/analog converter.

According to the image output apparatus of the fifth aspect, it is not necessary to provide a dedicated level adjustment amount correcting circuit, which results in a simple structure.

According to a sixth aspect of the invention, in the image output apparatus according to the fifth aspect, the input switching unit may include a reference signal selection/output unit that selectively outputs a black reference signal and a white reference signal as the first reference signal. When the reference signal selection/output unit selects the black reference signal, the adjustment amount correcting unit may perform one of the adjustment of the offset by the offset adjusting unit and the adjustment of the gain by the gain adjusting unit. When the reference signal selection/output unit selects the white reference signal, the adjustment amount correcting unit may perform the other adjustment.

According to the image output apparatus of the sixth aspect, it is possible to adjust the gain and offset of the digital/analog converter with a simple structure.

According to a seventh aspect of the invention, in the image output apparatus according to any one of the first to third aspects, each of the level adjusting units may include a digital/analog converter that converts the video input signal, which is a digital signal, into an analog signal, and the adjustment amount correcting unit may include a unit that adjusts at least one of the gain and the offset of the digital/analog converter to adjust a level.

According to the image output apparatus of the seventh aspect, it is not necessary to provide a dedicated level adjustment amount correcting circuit, which results in a simple structure.

According to an eighth aspect of the invention, in the image output apparatus according to any one of the first to seventh aspects, the display device may include: an active matrix unit that has a plurality of scanning lines extending in a horizontal direction and a plurality of signal lines extending in a vertical direction arranged in a matrix on a substrate, and pixel electrodes and switching elements formed at intersections of the scanning lines and the signal lines; and a plurality of connection lines that classify the plurality of signal lines according to the number of channels and connect the signal lines and connection terminals for the corresponding channels among the connection terminals corresponding to each channel of the display device.

According to the image output apparatus of the eighth aspect, the image output apparatus can be used for an active matrix display device.

According to a ninth aspect of the invention, a projector includes: the image output apparatus according to any one of the first to eighth aspects.

According to the projector of the ninth aspect, it is possible to provide a projector having various effects described in the first to eighth aspects.

According to a tenth aspect of the invention, there is provided a method of controlling an image output apparatus that outputs video signals to a display device dividing a screen forming an image, into a plurality of channels and driving the divided channels and includes a plurality of level adjusting units which are provided for each channel, adjust the levels of video input signals for each channel, and output adjusted output signals to the display device. The method includes: inputting the first reference signal to each of the level adjusting units, instead of the image input signal, during a first predetermined period included in a preparation period after a power supply is turned on or a preparation period before display starts; repeatedly performing a basic correction process of comparing an output signal from each of the level adjusting units with a second reference signal during the first predetermined period and increasing or decreasing an adjustment amount of the corresponding level adjusting unit by a predetermined correction amount such that a difference between the signals is reduced a plurality of times; periodically inputting the first reference signal to each of the level adjusting units, instead of the video input signal, for each second predetermined period out of the preparation period; and periodically performing the basic correction process for each second predetermined period a predetermined number of times that is less than that for the first predetermined period.

According to the image output method, similar to the image output apparatus, it is possible to reduce the overall size of an apparatus and sufficiently reduce image irregularity.

The invention can include various embodiments. For example, the invention can be applied to an image output system, a computer program for implementing the function of the image output apparatus, a recording medium having the computer program recorded thereon, and data signals that include the computer program and are carried on a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to examples.

Figure 1:
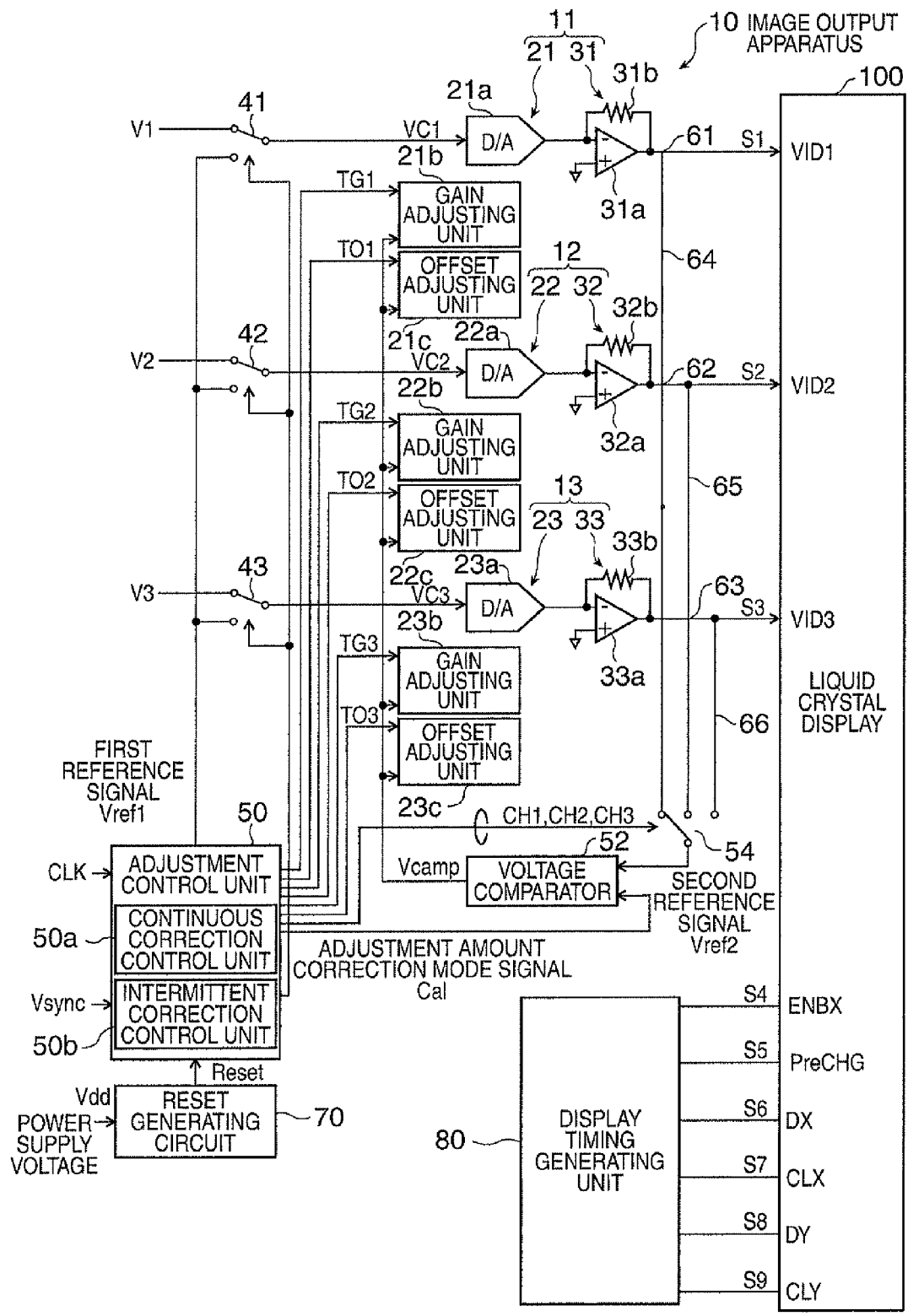
FIG. 1 is a circuit diagram illustrating the structure of an image output apparatus according to an embodiment of the invention.
Figure 2:
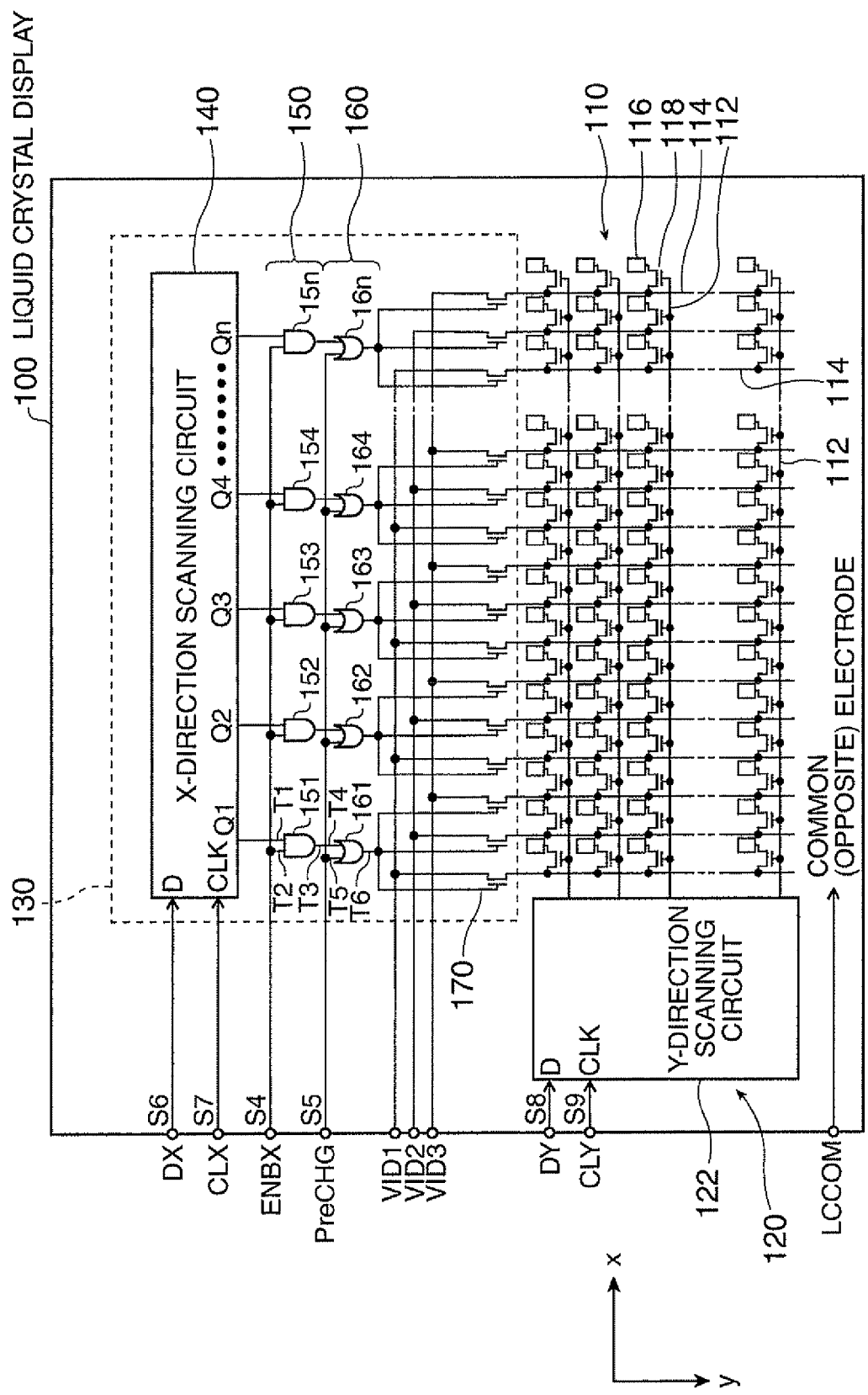
FIG. 2 is a circuit diagram illustrating a liquid crystal display connected to the image output apparatus.

FIG. 1 is a circuit diagram illustrating the structure of an image output apparatus 10 according to an embodiment of the invention. FIG. 2 is a circuit diagram illustrating a liquid crystal display 100, serving as a liquid crystal display device, connected to the image output apparatus 10. First, the liquid crystal display 100 will be described.

A. Structure of Liquid Crystal Display

The liquid crystal display 100 adopts an active matrix driving method. As shown in FIG. 2, the liquid crystal display 100 includes a liquid crystal panel 110 that displays an image, a scanning line driving circuit 120 that drives the liquid crystal panel 110, and a signal line driving circuit 130 that drives the liquid crystal panel 110.

The liquid crystal panel 110 includes an array substrate (not shown). A plurality of scanning lines 112 extending in an X direction (hereinafter, referred to as a 'horizontal direction') and a plurality of signal lines 114 extending in a Y direction (hereinafter, referred to as a 'vertical direction') are arranged in a matrix on the array substrate, and pixel electrodes (pixel pattern) 116, which are transparent electrodes, and thin film transistors (TFTs) 118, serving as switching elements, are formed at intersections of the scanning lines and the signal lines. Each of the TFTs 118 has a gate electrode connected to the scanning line 112, a source electrode connected to the signal line 114, and a drain electrode connected to the pixel electrode 116. In this way, an active matrix unit including the scanning lines 112, the signal lines 114, the pixel electrodes 116, and the TFTs 118 is formed on the substrate.

Although not shown in the drawings, the liquid crystal panel 110 further includes an opposite substrate that is opposite to the array substrate having the above-mentioned structure and has an opposite electrode formed thereon, and a liquid crystal material is provided between the array substrate and the opposite substrate with alignment films interposed therebetween.

The scanning line driving circuit 120 includes a Y-direction scanning circuit 122. The Y-direction scanning circuit 122 is connected to the scanning lines 112 of the liquid crystal panel 110. The Y-direction scanning circuit 122 receives a vertical start signal S8 and a vertical clock signal S9 transmitted from the outside of the liquid crystal display 100, and scans the active matrix unit in the vertical direction on the basis of the vertical start signal S8 and the vertical clock signal S9 to sequentially select the scanning lines 112.

The signal line driving circuit 130 is connected to the signal lines 114 of the liquid crystal panel 110. The signal line driving circuit 130 includes an X-direction scanning circuit 140, an enable control unit 150, and a pre-charge driving circuit 160.

The X-direction scanning circuit 140 receives a horizontal start signal S6 and a horizontal clock signal S7 transmitted from the outside of the liquid crystal display 100, and scans the active matrix unit in the horizontal direction on the basis of the horizontal start signal S6 and the horizontal clock signal S7 to sequentially select the signal lines 114.

The enable control unit 150 includes n (n is a positive integer) AND circuits 151, 152, ..., 15n, and the first input terminals T1 of the AND circuits 151 to 15n are connected to n output terminals Q1, Q2, ..., Qn of the X-direction scanning circuit 140, respectively. The second input terminals T2 of the AND circuits 151 to 15n are connected to an enable signal terminal ENBX, which is one of the connection terminals of the liquid crystal display 100, through one line. The output terminals T3 of the AND circuits 151 to 15n are connected to OR circuits, which will be described below, of the pre-charge driving circuit 160.

The pre-charge driving circuit 160 includes n OR circuits 161, 162, ..., 16n, and the output terminals T3 of the AND circuits 151 to 15n are connected to the first input terminals T4 of the OR circuits 161 to 16n. The second input terminals T5 of the OR circuits 161 to 16n are connected to a pre-charge timing signal terminal PreCHG, which is one of the connection terminals of the liquid crystal display 100, through one line.

Each of the output terminals T3 of the OR circuits 161 to 16n is branched into three lines, and TFTs 170 that are the same as the switching elements formed on the liquid crystal panel 110 are connected to the branch lines. Specifically, each of the branch lines is connected to a gate electrode of the TFT 170. The TFT 170 is referred to as a 'scanning TFT' to be discriminated from the TFT 118 formed on the liquid crystal panel 110. The TFT 118 formed on the liquid crystal panel 110 is referred to as a 'pixel TFT'.

A drain electrode of the scanning TFT 170 is connected to the corresponding signal line 114 of the liquid crystal panel 110. That is, the number of scanning TFTs 170 is equal to that of signal lines 114. Therefore, since the number of scanning TFTs 170 is 3×n, the number of signal lines 114 is also 3×n. That is, n is one-third of the number of signal lines. In other words, n is one-third of the number of signal lines such that the liquid crystal panel 110 is divided into three parts in the horizontal direction and the three parts are driven.

Each group of the scanning TFTs 170 connected to the same one of the OR circuits 161 to 16n can be divided into a scanning TFT for a first channel, a scanning TFT for a second channel, and a scanning TFT for a third channel. In the groups of the scanning TFTs, the scanning TFTs for the same channel are connected to one line, and lines in each group are connected to analog video terminals VID1, VID2, and VID3 of the liquid crystal display 100.

According to the liquid crystal display 100 having the above-mentioned structure, the Y-direction scanning circuit 120 selects the scanning lines 112 and the X-direction scanning circuit 140 selects the signal lines 114 to transmit electric signals from the analog video terminals VID1, VID2, and VID3 to a desired pixel TFT 118. As a result, in the liquid crystal display 100, only the liquid crystal in a region interposed between the pixel electrode and the opposite electrode corresponding to the pixel TFT 118 receives an electric field between the electrodes and the alignment of the liquid crystal is changed. Therefore, the liquid crystal serves as a liquid crystal shutter for each pixel. In addition, according to the liquid crystal display 100, since a horizontal write enable signal S4 is input to the enable signal terminal ENBX, it is possible to validate output signals from the output terminals Q1, Q2, ..., Qn of the X-direction scanning circuit 140. Since a pre-charge timing signal S5 is input to the pre-charge timing signal terminal PreCHG, it is possible to apply a pre-charge voltage to each of the signal lines 114 for a pre-charge period determined by the pre-charge timing signal S5.

B. Structure of Image Output Apparatus

As shown in FIG. 1, the image output apparatus 10 is connected to the liquid crystal display 100. The image output apparatus 10 transmits video signals through three channels, that is, the first channel (channel 1) the second channel (channel 2), and the third channel (channel 3), and performs a desired amplifying process on the video signals for the three channels that are output from an image processing circuit (not shown). The video signals for the three channels are referred to as first to third digital video input signals V1, V2, and V3.

The first to third digital video input signals V1, V2, and V3 are converted into analog signals by D/A converting units 21, 22, and 23 and then amplified at a predetermined amplification ratio by amplifying units 31, 32, and 33, respectively. That is, the D/A converting units 21, 22, and 23 and the amplifying units 31, 32, and 33 for each channel form level adjusting units 11, 12, and 13 that adjust input levels, respectively.

The amplifying units 31, 32, and 33 include operational amplifiers 31a, 32a, and 33a and resistors 31b, 32b, and 33b, respectively. The amplifying units 31, 32, and 33 have the same amplification ratio in terms of specifications. The output signals of the amplifying units 31, 32, and 33 are input as analog video output signals S1, S2, and S3 to the analog video terminals VID1, VID2, and VID3 of the liquid crystal display 100, respectively. If it is necessary to discriminate the channels of the 'level adjusting units', the 'D/A converting units', the 'amplifying units', the 'analog video output signals', and the 'analog video terminals', ordinal numbers, such as 'first', 'second', and 'third', are given to them.

As described above, the amplifying units 31, 32, and 33 have the same amplification ratio in terms of specifications, but strictly, the amplification ratios are different from each other due to individual difference or ambient temperature. In order to correct the difference between the amplification ratios, the D/A converting units 21, 22, and 23 include D/A converters 21a, 22a, and 23a that perform digital/analog conversion, gain adjusting units 21b, 22b, and 23b that adjust the gains of the D/A converters 21a, 22a, and 23a, and offset adjusting units 21c, 22c, and 23c that adjust the offsets of the D/A converters 21a, 22a, and 23a, respectively. A unit using a combination of an up/down counter and an R-2R D/A converter may be used as a specific example of the gain adjusting units 21b, 22b, and 23b and the offset adjusting units 21c, 22c, and 23c. In this case, it is possible to reduce costs.

Input switches 41, 42, and 43 are provided in the front stages of the D/A converting units 21, 22, and 23, respectively. The input switches 41, 42, and 43 perform switching between a first state that transmits the first to third digital video input signals V1, V2, and V3 to the D/A converting units 21, 22, and 23 and a second state that transmits a first reference signal Vref1 instead of the digital video input signals V1, V2, and V3 to the D/A converting units 21, 22, and 23. Specifically, each of the input switches 41, 42, and 43 receives an adjustment amount correction mode signal Cal. When the adjustment amount correction mode signal Cal is at a low level, that is, in an image display mode, each of the input switches performs switching to the first state. When the adjustment amount correction mode signal Cal is at a high level, that is, in an adjustment amount correction mode, each of the input switches performs switching to the second state.

The first reference signal Vref1 is input from an adjustment control unit 50 to each of the input switches 41 to 43. The adjustment control unit 50 outputs the adjustment amount correction mode signal Cal to each of the input switches 41 to 43. In addition, the adjustment control unit 50 outputs control signals TG1, TG2, and TG3 for defining correction timing to the gain adjusting units 21b, 22b, and 23b of the D/A converting units 21, 22, and 23, and outputs control signals TO1, TO2, and TO3 for defining correction timing to the offset adjusting units 21c, 22c, and 23c, respectively. Further, the adjustment control unit 50 outputs a second reference signal Vref2 to a voltage comparator 52, which will be described below.

The adjustment control unit 50 receives a clock signal CLK and a vertical synchronization signal Vsync, and controls the gain adjusting units 21b, 22b, and 23b and the offset adjusting units 21c, 22c, and 23c. Therefore, the adjustment control unit 50 is composed of a so-called microcomputer (or a logic circuit). The microcomputer is formed by integrating a CPU, a memory, and an I/O into one chip, and serves as a continuous correction control unit 50a and an intermittent correction control unit 50b. The continuous correction control unit 50a and the intermittent correction control unit 50b of the microcomputer perform an adjustment amount correcting process. The adjustment amount correcting process will be described in detail below.

Branch lines 64, 65, and 66 are connected to connection lines 61, 62, and 63 that connect the amplifying units 31, 32, and 33 to the analog video terminals VID1, VID2, and VID3, respectively, and the other ends of the branch lines 64, 65, and 66 are connected to an output switch 54. The output switch 54 is electrically connected to the voltage comparator 52. The output switch 54 selects one of the analog video output signals S1, S2, and S3 transmitted from the analog video terminals VID1, VID2, and VID3, and transmits the selected signal to the voltage comparator 52. In addition, the output switch 54 receives a first channel instruction CH1 corresponding to channel 1, a second channel instruction CH2 corresponding to channel 2, and a third channel instruction CH3 corresponding to channel 3 from the adjustment control unit 50, and selects the analog video output signals S1, S2, and S3 on the basis of the first to third instructions CH1 to CH3. That is, when the first channel instruction CH1 is at a high level, the output switch 54 selects the first analog video output signal S1. When the second channel instruction CH2 is at a high level, the output switch 54 selects the second analog video output signal S2. When the third channel instruction CH3 is at a high level, the output switch 54 selects the third analog video output signal S3.

The voltage comparator 52 compares the analog video output signal S1, S2, and S3 transmitted from the output switch 54 with the second reference signal Vref2 transmitted from the adjustment control unit 50, and determines voltage levels. The voltage comparator 52 outputs a comparison output signal Vcomp indicating the determined voltage levels to the gain adjusting units 21b, 22b, and 23b and the offset adjusting units 21c, 22c, and 23c of the D/A converting units 21, 22, and 23.

The gain adjusting units 21b, 22b, and 23b determine an adjustment direction on the basis of the comparison output signal Vcomp transmitted from the voltage comparator 52, and adjusts the gains (amplification ratios) of the amplifying units 31, 32, and 33 at times corresponding to the timing signals TG1, TG2, and TG3 transmitted from the adjustment control unit 50. That is, when it is determined that the analog video output signal S1, S2, S3 are higher than the second reference signal Vref2, the gain adjusting units 21b, 22b, and 23b adjust the gain such that the gain is decreased by one step. On the other hand, when it is determined that the analog video output signal S1, S2, and S3 are lower than the second reference signal Vref2, the gain adjusting units 21b, 22b, and 23b adjust the gain such that the gain is increased by one step.

The offset adjusting units 21c, 22c, and 23c determine an adjustment direction (an increasing direction or a decreasing direction) on the basis of the comparison output signal Vcomp transmitted from the voltage comparator 52, and adjust the offsets of the amplifying units 31, 32, and 33 at times corresponding to the timing signals TO1, TO2, and TO3 transmitted from the adjustment control unit 50. That is, when it is determined that the voltage levels of the analog video terminals VID1, VID2, and VID3 are high, the offset adjusting units 21c, 22c, and 23c adjust the offset such that the offset is decreased by one step. On the other hand, when it is determined that the voltage levels of the analog video terminals VID1, VID2, and VID3 are low, the offset adjusting units 21c, 22c, and 23c adjust the offset such that the offset is increased by one step.

The image output apparatus 10 further includes a reset generating circuit 70. The reset generating circuit 70 receives a power supply voltage Vdd, and outputs a reset signal Reset to the microcomputer (or a logic circuit) forming the adjustment control unit 50.

The image output apparatus 10 further includes a display timing generating unit 80. Since the display timing generating unit 80 has a known structure, a detailed description thereof will be omitted. Briefly, the display timing generating unit 80 generates the horizontal write enable signal S4, the precharge timing signal S5, the horizontal start signal S6, the horizontal clock signal S7, the vertical start signal S8, and the vertical clock signal S9 on the basis of the clock signal CLK, the vertical synchronization signal Vsync, and the horizontal synchronization signal Hsync, and outputs these signals S4 to S9 to the liquid crystal display 100.

C. Adjustment Amount Correcting Process

Figure 3:
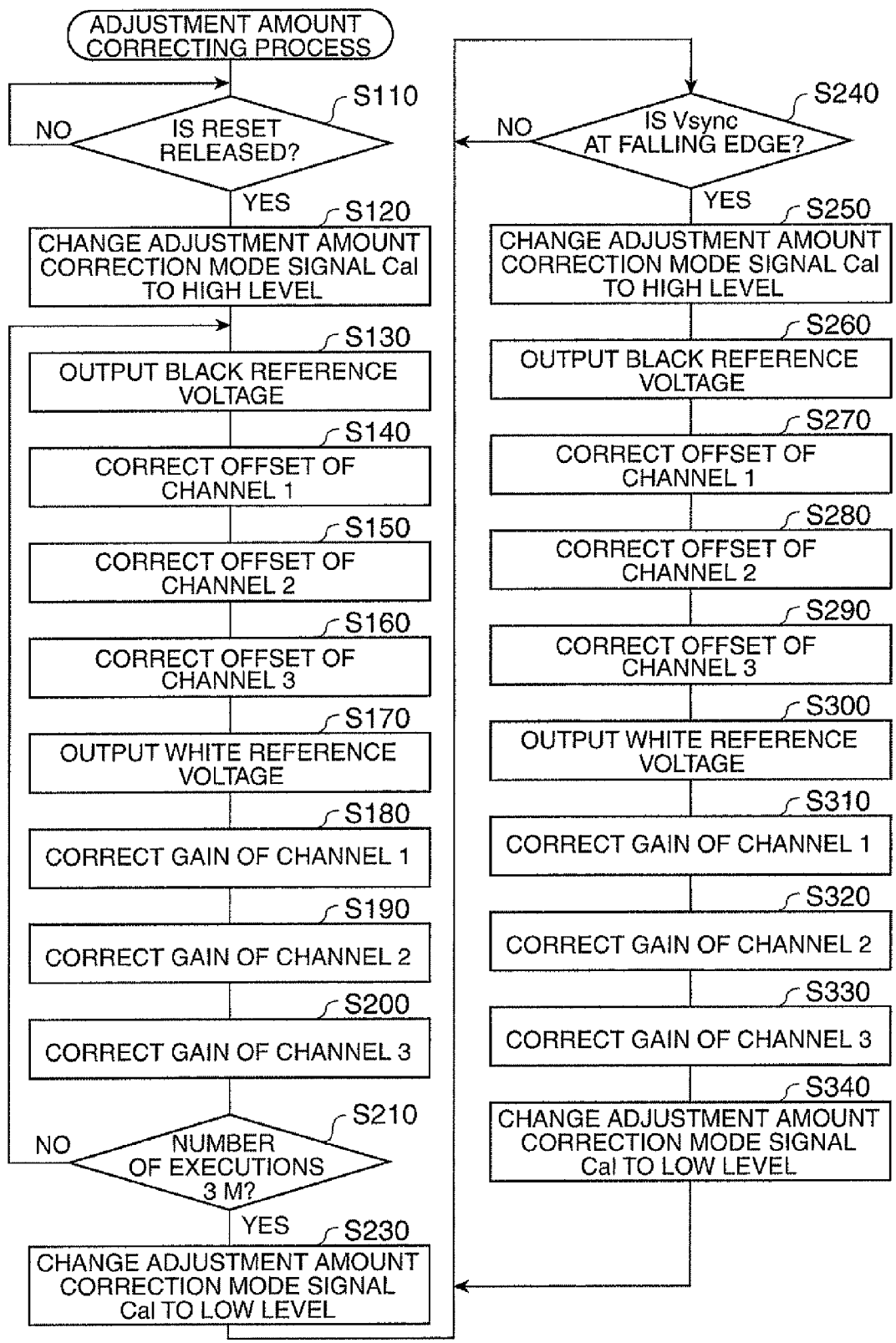
FIG. 3 is a flowchart illustrating an adjustment amount correcting process performed by an adjustment control unit of the image output apparatus.
Figure 4:
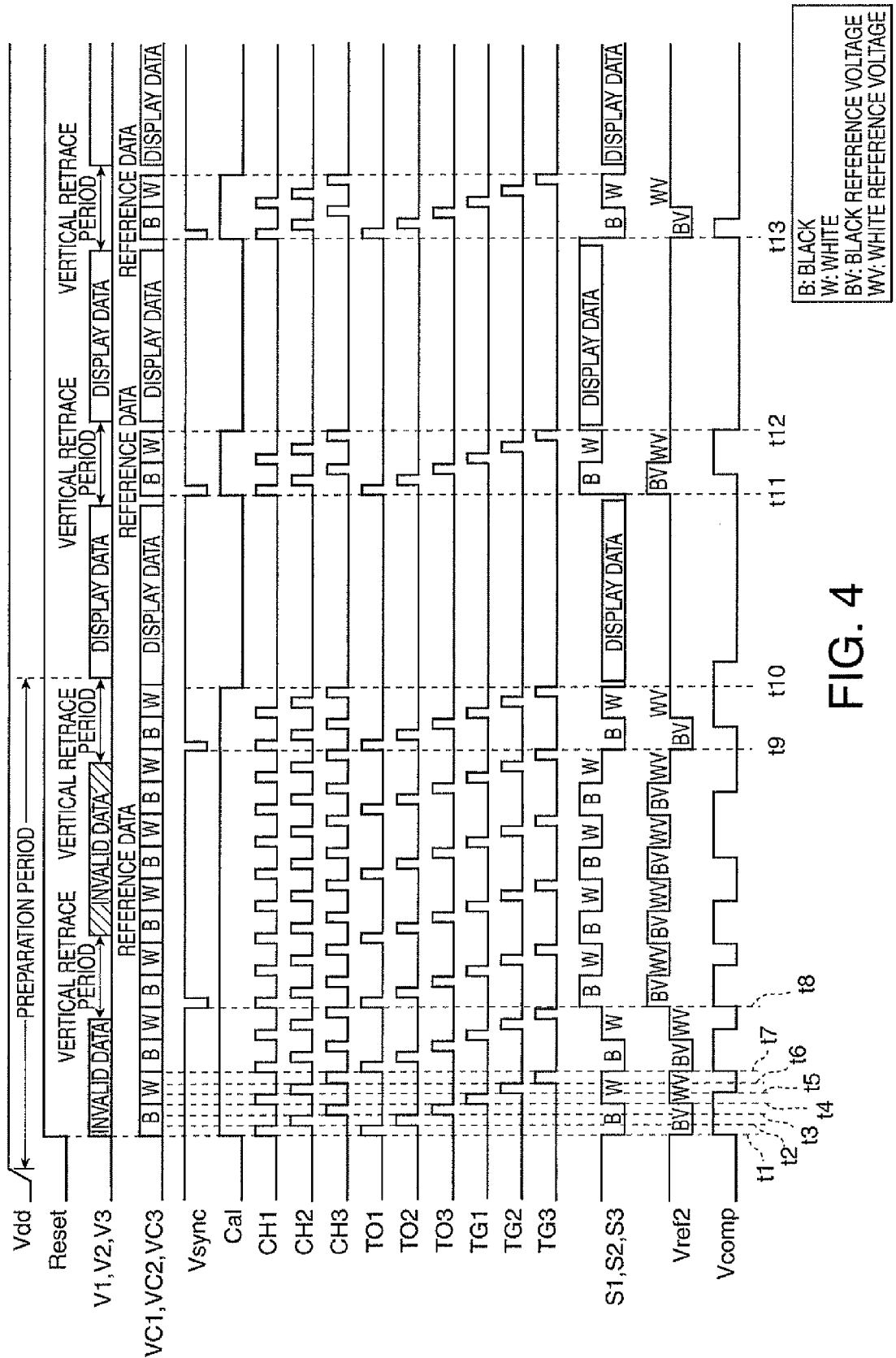
FIG. 4 is a timing chart illustrating a variation in the internal signals of the image output apparatus.

Next, the adjustment amount correcting process performed by the adjustment control unit 50 of the image output apparatus 10 will be described. FIG. 3 is a flowchart illustrating the adjustment amount correcting process, and FIG. 4 is a timing chart illustrating a variation in the internal signals of the image output apparatus 10. The adjustment amount correcting process will be described with reference to the flowchart shown in FIG. 3, and the variation in the signals will be described with reference to FIG. 4, if necessary. As described above, the adjustment amount correcting process is performed by a microcomputer (or a logic circuit) forming the adjustment control unit 50. The adjustment amount correcting process starts when the state of a power supply of the image output apparatus 10 is changed from an off state to an on state.

As shown in FIG. 3, when the process starts, the CPU of the microcomputer determines whether a reset state is released on the basis of the reset signal Reset transmitted from the reset generating circuit 70. If it is determined that the reset state is not released, the CPU repeatedly performs Step S110 to wait for the release of the reset state. If it is determined in Step S110 that the reset state is released, the CPU determines that the microcomputer shifts to the operating state and proceeds the process to Step S120.

In Step S120, the CPU outputs the adjustment amount correction mode signal Cal at a high level (Step S120), outputs a black reference voltage as the first reference signal Vref1 (Step S130), and adjusts the offset of the channel 1 (Step S140). In this embodiment, the liquid crystal display 100 is a normally black type, and outputs the black reference voltage to adjust the offset. However, when the liquid crystal display is a normally white type, the liquid crystal display may output a white reference voltage to adjust the offset.

When the adjustment amount correction mode signal Cal is changed to the high level in Step S120, the input switches 41, 42, and 43 perform switching to the second state that transmits the first reference signal Vref1 to the D/A converting units 21, 22, and 23. As can be seen from the timing chart shown in FIG. 4, at a time t1 immediately after the power supply voltage Vdd is applied, the adjustment amount correction mode signal Cal is at a high level.

When the input switches 41, 42, and 43 perform switching such that the first reference signal Vref1 is selected in Step S120 and the black reference voltage is output in Step S130, the digital input signals VC1, VC2, and VC3 of the D/A converting units 21, 22, and 23 become the black reference voltages, that is, black data, as shown in FIG. 4.

In Step S140 of adjusting the offset of the channel 1, specifically, the following processes i) to iii) are performed: i) a process of changing the first channel instruction CH1 corresponding to the channel 1 that is transmitted to the output switch 54 to a high level such that the output switch 54 selects the first analog video terminal VID1; ii) a process of outputting the second reference signal Vref2 corresponding to the black reference voltage output in Step S130 to the voltage comparator 52; and iii) a process of outputting the timing signal TO1 to the offset adjusting unit 21c of the first D/A converting unit 21 corresponding to the channel 1.

After the black reference voltage is input to the first D/A converting unit 21 in Step S130, the processes i) to iii) are performed to control the voltage comparator 52 to compare the first analog video output signal S1 (see FIG. 4), which is the output of the first amplifying unit 31 when the black reference voltage is input, with the second reference signal Vref2 corresponding to the black reference voltage. When the level of the first analog video output signal S1 is higher than that of the second reference signal Vref2, the offset adjusting unit 21c decreases the offset of the first D/A converting unit 21 by one step. On the other hand, when the level of the first analog video output signal S1 is lower than that of the second reference signal Vref2, the offset adjusting unit 21c increases the offset of the first D/A converting unit 21 by one step.

The output of the amplifying unit 31 when the black reference voltage is input corresponds to the offset of a first level adjusting unit 11. Therefore, the output is compared with the second reference signal Vref2, and the offset is increased or decreased by a predetermined correction amount such that the difference therebetween is reduced. In this way, it is possible to make the offset of the first level adjusting unit 11 corresponding to the channel 1 close to an offset determined by the second reference signal Vref2.

After Step S140 ends, the CPU performs a process of adjusting the offset of the channel 2 (Step S150). This process is similar to Step S140, but performed for the channel 2. Specifically, the following processes iv) to vi) are performed: iv) a process of changing the second channel instruction CH2 corresponding to the channel 2 that is transmitted to the output switch 54 to a high level such that the output switch 54 selects the second analog video terminal VID2; v) a process of outputting the second reference signal Vref2 corresponding to the black reference voltage output in Step S130 to the voltage comparator 52; and vi) a process of outputting the timing signal TO2 to the offset adjusting unit 22c of the second D/A converting unit 22 corresponding to the channel 2.

As a result of Step S150, it is possible to make the offset of a second level adjusting unit 12 corresponding to the channel 2 close to the offset determined by the second reference signal Vref2. Then, the CPU performs a process of adjusting the offset of the channel 3 (Step S160). This process is similar to Step S140, but performed for the channel 3. Since this process for the channel 3 is the same as those for the channel 1 and the channel 2, a description thereof will be omitted. As a result, it is possible to make the offset of a third level adjusting unit 13 corresponding to the channel 3 close to the offset determined by the second reference signal Vref2. As a result of Steps S140 to S160, the offset of each of the first to third level adjusting units 11 to 13 corresponding to the channels 1, 2, and 3 is corrected by one step in a direction in which it becomes uniform.

Returning to FIG. 3, after Step S160 is performed, the CPU outputs a white reference voltage as the first reference signal Vref1 (Step S170), and performs a process of adjusting the gain of the channel 1 (Step S180). In this embodiment, the liquid crystal display 100 is a normally black type, and outputs a white reference voltage to adjust the gain. However, when the liquid crystal display is a normally white type, it may output a black reference voltage to adjust the gain. In the process of adjusting the gain of the channel 1 in Step S180, specifically, the following processes vii) to ix) are performed: vii) a process of changing the first channel instruction CH1 corresponding to the channel 1 that is transmitted to the output switch 54 to a high level such that the output switch 54 selects the first analog video terminal VID1; viii) a process of outputting the second reference signal Vref2 corresponding to the white reference voltage output in Step S170 to the voltage comparator 52; and ix) a process of outputting the timing signal TG1 to the gain adjusting unit 21b of the first D/A converting unit 21 corresponding to the channel 1.

After the white reference voltage is input to the first D/A converting unit 21 in Step S170, the processes vii) to ix) are performed to control the voltage comparator 52 to compare the first analog video output signal S1 (see FIG. 4), which is the output of the first amplifying unit 31 when the white reference voltage (white data; see FIG. 4) is input, with the second reference signal Vref2 corresponding to the white reference voltage. When the level of the first analog video output signal S1 is higher than that of the second reference signal Vref2, the gain adjusting unit 21b decreases the gain of the first D/A converting unit 21 by one step. On the other hand, when the level of the first analog video output signal S1 is lower than that of the second reference signal Vref2, the gain adjusting unit 21b increases the gain of the first D/A converting unit 21 by one step.

The output of the amplifying unit 31 when the white reference voltage is input corresponds to the gain of the first level adjusting unit 11. Therefore, the output is compared with the second reference signal Vref2, and the gain is increased or decreased by a predetermined correction amount such that the difference therebetween is reduced. In this way, it is possible to make the gain of the first level adjusting unit 11 corresponding to the channel 1 close to a gain determined by the second reference signal Vref2.

After Step S180 ends, the CPU performs a process of adjusting the gain of the channel 2 (Step S190). This process is similar to Step S180, but performed for the channel 2. Specifically, the following processes x) to xii) are performed: x) a process of changing the second channel instruction CH2 corresponding to the channel 2 that is transmitted to the output switch 54 to a high level such that the output switch 54 selects the second analog video terminal VID2; xi) a process of outputting the second reference signal Vref2 corresponding to the white reference voltage output in Step S170 to the voltage comparator 52; and xii) a process of outputting the timing signal TG2 to the gain adjusting unit 22b of the second D/A converting unit 22 corresponding to the channel 2.

As a result of Step S190, it is possible to make the gain of the second level adjusting unit 12 corresponding to the channel 2 close to the gain determined by the second reference signal Vref2. Then, the CPU performs a process of adjusting the gain of the channel 3 (Step S200). This process is similar to Step S180, but performed for the channel 3. Since this process for the channel 3 is the same as those for the channel 1 and the channel 2, a description thereof will be omitted. As a result, it is possible to make the gain of the third level adjusting unit 13 corresponding to the channel 3 close to the gain determined by the second reference signal Vref2. As a result of Steps S180 to S200, the gain of each of the first to third level adjusting units 11 to 13 corresponding to the channels 1, 2, and 3 is corrected by one step in a direction in which it becomes uniform.

The process corresponding to Steps S120 to S200, that is, the process of correcting the offsets and the gains of the first to third level adjusting units 11 to 13 corresponding to channels 1, 2, and 3 is hereinafter referred to as a 'basic correction process'. That is, the CPU performs Steps S120 to S200 to execute one basic correction process.

After Step S200 is performed, the CPU calculates the number of times Steps S130 to S200 are performed, that is, the number of times the basic correction process is executed, and determines whether the number of times the basic correction process is executed is equal to or greater than a predetermined number of times M (Step S210) (M is a positive integer in the range of, for example, 10 to 20). If it is determined that the number of executions is less than the predetermined number of times M, the CPU returns to Step S130 and repeatedly performs Steps S130 to S210.

When Steps S130 to S210 are repeatedly performed and it is determined in Step S210 that the number of executions is equal to or greater than the predetermined number of times M, the CPU proceeds to Step S230 to change the adjustment amount correction mode signal Cal to a low level, and ends the adjustment amount correction mode. During a predetermined period immediately after the power supply is turned on, that is, until a time that is M times longer than the time required to perform Steps S130 to S200 elapses immediately after the power supply is turned on, the basic correction process is performed M times by the process up to Step S230. The continuous correction control unit 50a (FIG. 1) performs Steps S110 to S230.

The predetermined number of times M, which is a limited number of times the basic correction process is executed, is predetermined such that the process ends within a preparation period from when the power supply is turned on to when the liquid crystal display 100 starts display, and is in the range of 10 to 20, as described above. Therefore, the adjustment amount correction mode signal Cal is at a low level at a time t10 which is immediately before the end of the preparation period, as shown in FIG. 4.

Signals vary in Step S110 to S230 as follows. As shown in the timing chart of FIG. 4, when the adjustment amount correction mode signal Cal is at a high level at the time t1, the channel is switched to the channel 1, and the timing signal TO1 is output to the offset adjusting unit 21c corresponding to the channel 1. Then, the output signal S1 is compared with the second reference signal Vref2 and the comparison result is output as the voltage Vcomp (the period from the time t1 to a time t2). Then, the channel is switched to the channel 2, and the timing signal TO2 is output to the offset adjusting unit 22c corresponding to the channel 2. Then, the output signal S2 is compared with the second reference signal Vref2, and the comparison result is output as the voltage Vcomp (the period from the time t2 to a time t3). Then, the channel is switched to the channel 3, and the timing signal TO3 is output to the offset adjusting unit 23c corresponding to the channel 3. Then, the output signal S3 is compared with the second reference signal Vref2, and the comparison result is output as the voltage Vcomp (the period from the time t3 to a time t4).

Then, the channel is switched to the channel 1, and the timing signal TG1 is output to the gain adjusting unit 21b corresponding to the channel 1. Then, the output signal S1 is compared with the second reference signal Vref2, and the comparison result is output as the voltage Vcomp (the period from the time t4 to a time t5). Then, the channel is switched to the channel 2, and the timing signal TG2 is output to the gain adjusting unit 22b corresponding to the channel 2. Then, the output signal S2 is compared with the second reference signal Vref2, and the comparison result is output as the voltage Vcomp (the period from the time t5 to a time t6). Then, the channel is switched to the channel 3, and the timing signal TG3 is output to the gain adjusting unit 23b corresponding to the channel 3. Then, the output signal S3 is compared with the second reference signal Vref2, and the comparison result is output as the voltage Vcomp (the period from the time t6 to a time t7). The basic correction process is performed during the period from the time t1 to the time t7 to adjust the offset and gain for each channel. In this way, the basic correction process is repeatedly performed M times. In FIG. 4, the basic correction process is performed 7 times for clarity of illustration.

In general, when a direct current is continuously applied, image quality deteriorates, and burn-in occurs in the liquid crystal display. Therefore, it is necessary to invert the polarity of an input signal. In this embodiment, polarity inversion is performed for each frame. Therefore, the level adjusting units 11 to 13 invert the polarities of the video output signals S1 to S3 at inversion time, and the adjustment control unit 50 inverts the polarity of the second reference signal Vref2 at each inversion time. That is, as shown in the timing chart of FIG. 4, the polarity of the black reference voltage of the second reference signal Vref2 is inverted at the falling edge of the vertical synchronization signal Vsync (times t8 and t9).

Returning to FIG. 3, after the continuous basic correction process ends immediately after the power supply is turned on in Step S230, the CPU proceeds to Step S240. In Step S240, the CPU determines whether the vertical synchronization signal Vsync is at a falling edge. If it is determined that the vertical synchronization signal Vsync is not at the falling edge, the CPU repeatedly performs Step S240 to wait until the vertical synchronization signal Vsync is at the falling edge. On the other hand, if it is determined in Step S240 that the vertical synchronization signal Vsync is at the falling edge (a time t11 of FIG. 4), the CPU proceeds to Step S250.

In Step S250, the CPU outputs the adjustment amount correction mode signal Cal at a high level. Then, the CPU outputs a black reference voltage as the first reference signal Vref1 (Step S260), performs a process of adjusting the offset of the channel 1 (Step S270), performs a process of adjusting the offset of the channel 2 (Step S280), and performs a process of adjusting the offset of the channel 3 (Step S290). Then, the CPU outputs a white reference voltage as the first reference signal Vref1 (Step S300), performs a process of adjusting the gain of the channel 1 (Step S310), performs a process of adjusting the gain of the channel 2 (Step S320), and performs a process of adjusting the gain of the channel 3 (Step S330).

Steps S260 to S330 are the same as Steps S130 to S200. That is, in Steps S260 to S330, the basic correction process is performed once. After Step S330 is performed, the CPU changes the adjustment amount correction mode signal Cal to a low level (Step S340). The adjustment amount correction mode signal Cal is changed to the low level at a time t12, which is immediately before the end of the vertical retrace period, as shown in FIG. 4. That is, the CPU performs the basic correction process once during the vertical retrace period.

After Step S340 is performed, the CPU returns to Step S240 and repeatedly performs the processes after Step S240. In this way, it is possible to perform the basic correction process once during each vertical retrace period. That is, the intermittent correction control unit 50b (FIG. 1) performs Steps S240 to S340. In addition, in the basic correction process during each vertical retrace period, the polarity of the second reference signal Vref2 is sequentially inverted. That is, as shown in the timing chart of FIG. 4, the polarity of the black reference voltage of the second reference signal Vref2 at a time t13 is inverted with respect to the polarity of the black reference voltage of the second reference signal Vref2 at a time t12 within the previous vertical retrace period.

In the image output apparatus 10 having the above-mentioned structure, portions of the level adjusting units 11 to 13 other than the gain adjusting units 21b to 23b and the offset adjusting units 21c to 23c form a 'level adjusting unit' according to the embodiment of the invention. The input switches 41, 42, and 43 and the adjustment control unit 50 form an 'input switching unit' according to the embodiment of the invention. The voltage comparator 52, the gain adjusting units 21b to 23b, the offset adjusting units 21c to 23c, and the adjustment control unit 50 form an 'adjustment amount correcting unit' according to the embodiment of the invention.

D. Operations and Effects of this Embodiment

The image output apparatus 10 according to the above-described embodiment performs the basic correction process of switching the signals input to the level adjusting units 11 to 13 for each channel from the digital video input signals V1, V2, and V3 to the first reference signal Vref1, comparing an output signal from each of the level adjusting units 11 to 13 with the second reference signal Vref2, and increasing or decreasing the adjustment amounts of the corresponding level adjusting units 11 to 13 by a predetermined correction amount such that the difference between the signals is reduced. As a result, it is possible to correct the adjustment amount of each of the level adjusting units 11 to 13 by a predetermined amount. In particular, in the image output apparatus 10, during the preparation period from when the power supply is turned on to when the liquid crystal display 100 starts display, the continuous correction control unit 50a switches an input signal to the first reference signal Vref1, and the basic correction process is repeatedly performed a plurality of times to correct the output signal from each of the level adjusting units 11 to 13 by a predetermined amount a plurality of times In addition, during the vertical retrace period that is periodically generated, the intermittent correction control unit 50b switches an input signal to the first reference signal Vref1, and the basic correction process is performed once to correct the output signal from each of the level adjusting units 11 to 13 by a predetermined amount.

Therefore, according to the image output apparatus 10, during the preparation period after the power supply is turned on, continuous correction is performed to reliably make the output signal from each of the level adjusting units uniform. After the preparation period, one correction process is periodically performed to maintain the level of each of the output signals to be uniform. In particular, it is preferable that a 'predetermined correction amount' in the basic correction process be small in order to increase correction accuracy. In this case, the smaller the correction amount becomes, the longer the time required to make the level of the output signal uniform becomes. In contrast, according to the image output apparatus 10, during the preparation period after the power supply is turned on that has no influence on image display, the basic correction process is continuously performed a plurality of times to reliably make the level of the output signal uniform. Thereafter, only one basic correction process is performed to correct a variation in the output signal in a short time. Therefore, it is possible to reduce a predetermined correction amount in the basic correction process. As a result, it is possible to improve correction accuracy.

According to the image output apparatus according to the first aspect, the output signal from each of the level adjusting units 11 to 13 can be used for a comparing process performed by the voltage comparator 52 without any change. Therefore, it is not necessary to provide an A/D converter, unlike the image output apparatus disclosed in JP-A-5-150751. Thus, it is easy to reduce the overall size of an apparatus, and it is possible to integrate the apparatus into one chip. As a result, according to the image output apparatus 10 of this embodiment, it is possible to reduce the overall size of an apparatus, and sufficiently reduce display irregularity.

In this embodiment, the intermittent correction control unit 50b performs the basic correction process during the vertical retrace period (a 'second period' according to the embodiment of the invention). Therefore, it is possible to correct a level adjustment amount without any influence on an image displayed by the liquid crystal display 100. In addition, in this embodiment, the gain adjusting units 21b to 23b and the offset adjusting units 21c to 23c are used to adjust the gains and offsets of the D/A converting units 21, 22, and 23, thereby correcting the adjustment amounts of the level adjusting units 11 to 13. Therefore, it is not necessary to provide a dedicated level adjustment amount correcting circuit, which results in a simple structure.

E. Modifications

The invention is not limited to the above-described example or embodiment, but various modifications and changes of the invention can be made without departing from the scope and spirit of the invention. For example, the following modifications can be made.

E1. First Modification

In the above-described embodiment, the liquid crystal display 100 divides a screen into three channels and drives the divided channels. However, the liquid crystal display may divide the screen into a plurality of channels other than three, such as 2, 6, and 12 channels, and drive the divided channels. In this case, the image output apparatus includes level adjusting units whose number corresponds to the number of channels. In addition, the liquid crystal display may divide the screen in the vertical direction, instead of the horizontal direction. In the above-described embodiment, the liquid crystal display device includes TFTs as scanning elements. However, the liquid crystal display device may include other scanning elements, such as MOS transistors. In addition, the liquid crystal display device may be driven by a simple matrix driving method, instead of the active matrix driving method.

E2. Second Modification

In the above-described embodiment, the period for which the continuous correction control unit 50a performs the basic correction process a plurality of times (a 'first predetermined period' according to the embodiment of the invention) is the preparation period from when the power supply is turned on to when the liquid crystal display 100 starts display. However, the period is not necessarily equal to the entire preparation period, but it may be a portion of the preparation period. A portion of the period does not necessarily start immediately after the power supply is turned on, but it may start after a predetermined period of time has elapsed from the turning-on of the power supply. In addition, the preparation period is not necessarily limited to a period until the liquid crystal display 100 starts display, but it may be a preparation period until the image output apparatus, the entire apparatus including the image output apparatus, or an apparatus related to the image output apparatus is ready to operate. Further, the first predetermined period is not completely included in the preparation period, but a portion of the first predetermined period may be included in the preparation period.

The first predetermined period is not limited to the preparation period from the turning-on of the power supply, but it may be included in a period until the operation mode returns from a standby mode to a normal operation mode. During the return period, a preparation operation for image projection (display), such as the setting of various registers, is performed, and the first predetermined period may be set so as to be included in the preparation period before display starts. In addition, the 'preparation period before display starts' is not limited to the preparation period until the operation mode returns from the standby mode to a normal operation mode. However, any period may be set as the preparation period as long as it is before image display starts.

E3. Third Modification

In the above-described embodiment, the second period for which the intermittent correction control unit 50b performs the basic correction process is the vertical retrace period.

However, the second period is not necessarily the vertical retrace period, but it may be other cyclic periods, such as a horizontal retrace period. In addition, the second period is substantially equal to the vertical retrace period. However, the second period is not necessarily equal to the entire vertical retrace period, but it may be a portion of the vertical retrace period.

E4. Fourth Modification

In the above-described embodiment, the intermittent correction control unit 50b performs the basic correction process once. However, the number of times the intermittent correction control unit 50b performs the basic correction process is not limited to one, but it may be, for example, two or three as long as it is less than the number of times the continuous correction control unit 50a performs the process.

E5. Fifth Modification

In the above-described embodiment, the gains and offsets of the D/A converters 21a, 22a, and 23a are adjusted to correct the adjustment amount for adjusting the level of an input signal. However, only one of the gain and the offset may be adjusted. In addition, the invention is not limited to the structure that changes the adjustment amount of the D/A converter. However, any structure may be used as long as it can correct the adjustment amount of a level adjusting unit.

E6. Sixth Modification

The above-described embodiment includes the image output apparatus 10 and the liquid crystal display 100. However, the invention may be applied to a projector. That is, the liquid crystal display 100 may be used as a liquid crystal panel, which is one of the parts of the projector, and the image output apparatus 10 may be provided in the projector.

In the above-described embodiment, a portion of the structure implemented by hardware may be replaced with software. Conversely, a portion of the structure implemented by software may be replaced with hardware.

What is claimed is:

1. An image output apparatus comprising:
   a display device having a light modulation section which is divided into a plurality of channels and drives the divided channels;
   a plurality of level adjusting units that are provided for each channel, adjust the levels of video input signals for each channel, and output adjusted output signals to the display device;
   an input switching unit that switches a signal input to each of the level adjusting units from the video input signal to a first reference signal;
   an adjustment amount correcting unit that performs a basic correction process of comparing an output signal from each of the level adjusting units when the first reference signal is input with a second reference signal and increasing or decreasing an adjustment amount of the corresponding level adjusting unit by a predetermined correction amount such that a difference between the signals is reduced;
   a continuous correction control unit that controls the input switching unit to perform switching to the first reference signal during a first predetermined period included in a preparation period after a power supply is turned on or a preparation period before display starts, and controls the adjustment amount correcting unit to repeatedly perform the basic correction process a plurality of times; and
   an intermittent correction control unit that controls the input switching unit to perform switching to the first reference signal during a second predetermined period that is periodically generated other than the preparation period and controls the adjustment amount correcting unit to perform the basic correction process a predetermined number of times that is less than the number of times the basic correction process is repeatedly performed under the control of the continuous correction control unit.

2. The image output apparatus according to claim 1, wherein the second predetermined period is a vertical retrace period.

3. The image output apparatus according to claim 1, wherein the predetermined number of times the basic correction process is performed under the control of the intermittent correction control unit is one.

4. The image output apparatus according to claim 1, wherein the adjustment amount correcting unit includes:
   a signal comparator that compares the output signal from each of the level adjusting units when the first reference signal is input with the second reference signal and determines whether the level of the output signal is higher than that of the second reference signal; and
   a predetermined correction amount increasing/decreasing unit that decreases the adjustment amount of the level adjusting unit by a predetermined correction amount when the signal comparator determines that the level of the output signal is higher than that of the second reference signal, and increases the adjustment amount of the level adjusting unit by the predetermined correction amount when the signal comparator determines that the level of the output signal is lower than that of the second reference signal.

5. The image output apparatus according to claim 4, wherein each of the level adjusting units includes a digital/analog converter that converts the video input signal, which is a digital signal, into an analog signal, and
   the predetermined correction amount increasing/decreasing unit includes:
   a gain adjusting unit that adjusts the gain of the digital/analog converter; and
   an offset adjusting unit that adjusts the offset of the digital/analog converter.

6. The image output apparatus according to claim 5, wherein the input switching unit includes a reference signal selection/output unit that selectively outputs a black reference signal and a white reference signal as the first reference signal,
   when the reference signal selection/output unit selects the black reference signal, the adjustment amount correcting unit performs one of the adjustment of the offset by the offset adjusting unit and the adjustment of the gain by the gain adjusting unit, and
   when the reference signal selection/output unit selects the white reference signal, the adjustment amount correcting unit performs the other adjustment.

7. The image output apparatus according to claim 1, wherein each of the level adjusting units includes a digital/analog converter that converts the video input signal, which is a digital signal, into an analog signal, and
   the adjustment amount correcting unit includes a unit that adjusts at least one of the gain and the offset of the digital/analog converter to adjust a level.

8. The image output apparatus according to claim 1, wherein the display device includes:
an active matrix unit that has a plurality of scanning lines extending in a horizontal direction and a plurality of signal lines extending in a vertical direction arranged in a matrix on a substrate, and pixel electrodes and switching elements formed at intersections of the scanning lines and the signal lines; and
a plurality of connection lines that classify the plurality of signal lines according to the number of channels and connect the signal lines and connection terminals for the corresponding channels among the connection terminals corresponding to each channel of the display device.

9. A projector comprising:
the image output apparatus according to claim 1.

10. A method of controlling an image output apparatus that outputs video signals to a display device dividing a screen forming an image, into a plurality of channels and driving the divided channels and includes a plurality of level adjusting units which are provided for each channel, adjust the levels of video input signals for each channel, and output adjusted output signals to the display device, the method comprising:

inputting the first reference signal to each of the level adjusting units, instead of the image input signal, during a first predetermined period included in a preparation period after a power supply is turned on or a preparation period before display starts;

repeatedly performing a basic correction process of comparing an output signal from each of the level adjusting units with a second reference signal during the first predetermined period and increasing or decreasing an adjustment amount of the corresponding level adjusting unit by a predetermined correction amount such that a difference between the signals is reduced a plurality of times;

periodically inputting the first reference signal to each of the level adjusting units, instead of the video input signal, for each second predetermined period out of the preparation period; and periodically performing the basic correction process for each second predetermined period a predetermined number of times that is less than that for the first predetermined period.

* * * * *